(12) United States Patent
Van Vliembergen

(10) Patent No.: US 9,798,454 B2
(45) Date of Patent: Oct. 24, 2017

(54) METHOD FOR PERFORMING A USER ACTION UPON A DIGITAL ITEM

(71) Applicant: OCE-TECHNOLOGIES B.V., Venlo (NL)

(72) Inventor: Eddy Van Vliembergen, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 299 days.

(21) Appl. No.: 14/222,579

(22) Filed: Mar. 21, 2014

(65) Prior Publication Data

US 2014/0289667 A1    Sep. 25, 2014

(30) Foreign Application Priority Data

Mar. 22, 2013   (EP) .................................... 13160583

(51) Int. Cl.
*G06F 3/0484*    (2013.01)
*G06F 3/0481*    (2013.01)
(Continued)

(52) U.S. Cl.
CPC ........ *G06F 3/04842* (2013.01); *G06F 3/0481* (2013.01); *G06F 3/0488* (2013.01);
(Continued)

(58) Field of Classification Search
CPC ...... G06F 3/0481; G06F 3/1284; G06F 21/36; G06F 2203/04808; G06F 3/0482;
(Continued)

(56) References Cited

U.S. PATENT DOCUMENTS

2009/0164894 A1   6/2009   Takekawa et al.
2009/0178011 A1*  7/2009   Ording ................ G06F 3/04883
                                                                    715/863

(Continued)

FOREIGN PATENT DOCUMENTS

DE    10 2010 048 745 A1    4/2012
WO       WO 00/75766 A1    12/2000
(Continued)

OTHER PUBLICATIONS

Silverman, 5 Android Apps to Turn Your Phone Into a Mobile Document Scanner, Sep. 3, 2011, Mashable, pp. 1-8. pertinent pp. 1-6, http://mashable.com/2011/09/03/android-apps-document-scanner-pdf/.*

*Primary Examiner* — Jennifer To
*Assistant Examiner* — Terri Filosi
(74) *Attorney, Agent, or Firm* — Birch, Stewart, Kolasch & Birch, LLP

(57) ABSTRACT

A method is disclosed for performing a user action to be applied on a digital item represented by a digital object displayable on a user interface touch screen of an electronic system. The electronic system is configured to apply the user action upon the digital item by means of an activation of a user operable element displayable on the user interface touch screen. The method includes displaying the digital object on the user interface touch screen, selecting the digital object, displaying a user operable element on the user interface touch screen, receiving an activation of the user operable element, executing the user action upon the digital item, showing an animation of a gesture to the digital object simultaneously with the execution of the user action upon the digital item, which gesture leads, when applied to the digital object, to execution of the user action upon the digital item.

17 Claims, 16 Drawing Sheets

(51) Int. Cl.
    *G06F 3/0488*     (2013.01)
    *H04N 1/00*     (2006.01)

(52) U.S. Cl.
    CPC ..... *H04N 1/00233* (2013.01); *H04N 1/00411* (2013.01); *H04N 2201/0082* (2013.01)

(58) Field of Classification Search
    CPC .... G06F 3/04845; G06F 3/0484; G06F 3/017; G06F 3/0237; G06F 3/0488; G06F 3/04842; G06F 3/048; G06F 3/0236; G06F 3/04883; G06F 3/0416
    USPC .......................................................... 715/781
    See application file for complete search history.

(56) References Cited

U.S. PATENT DOCUMENTS

| | | | | |
|---|---|---|---|---|
| 2010/0079413 | A1* | 4/2010 | Kawashima | B60K 35/00 345/175 |
| 2010/0321324 | A1* | 12/2010 | Fukai | A61B 8/00 345/173 |
| 2011/0242561 | A1 | 10/2011 | Nitta | |
| 2012/0158546 | A1* | 6/2012 | Rothschild | G06Q 30/0625 705/26.62 |
| 2012/0242604 | A1 | 9/2012 | Kato | |
| 2012/0256863 | A1* | 10/2012 | Zhang | G06Q 10/10 345/173 |
| 2013/0031516 | A1 | 1/2013 | Sawayanagi et al. | |
| 2013/0111208 | A1* | 5/2013 | Sabin | G06F 21/35 713/171 |
| 2013/0227470 | A1* | 8/2013 | Thorsander | G06F 3/04883 715/790 |
| 2013/0314341 | A1* | 11/2013 | Lee | G06F 3/0488 345/173 |

FOREIGN PATENT DOCUMENTS

| | | |
|---|---|---|
| WO | WO 2011/067890 A1 | 6/2011 |
| WO | WO 2012/166976 A2 | 12/2012 |

* cited by examiner

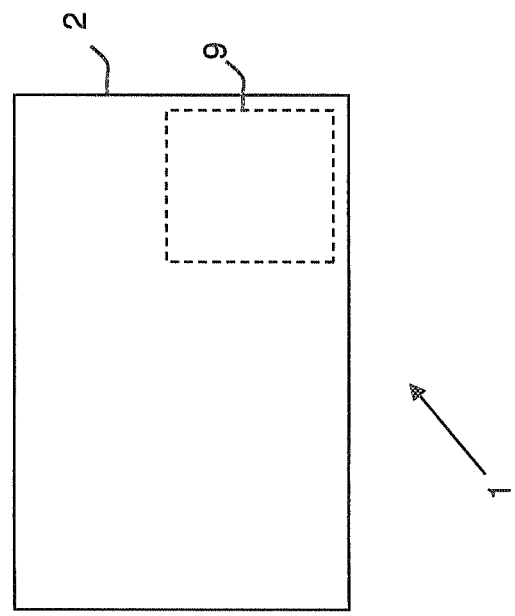
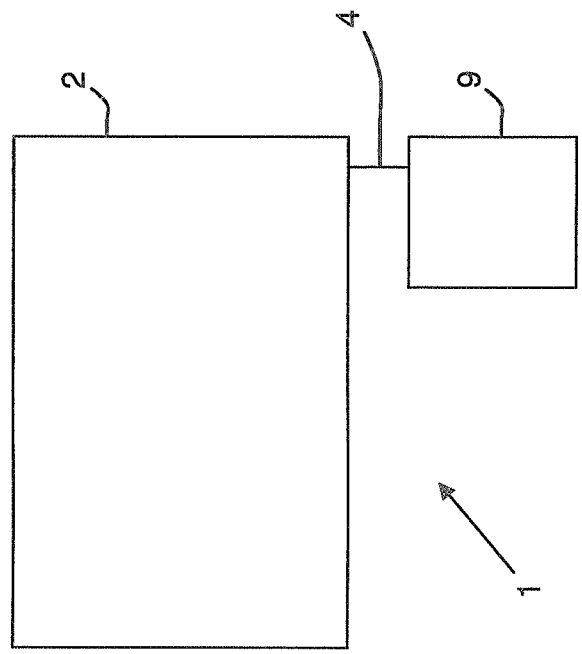

METHOD FOR PERFORMING A USER ACTION UPON A DIGITAL ITEM

CROSS-REFERENCE TO RELATED APPLICATIONS

This application claims priority under 35 U.S.C. §119(a) to Application No. 13160583.4, filed in Europe on Mar. 22, 2013, the entire contents of which is hereby incorporated by reference into the present application.

BACKGROUND OF THE INVENTION

1. Field of the Invention

The present invention relates to a method for performing a user action to be applied on a digital item represented by a digital object displayable on a user interface touch screen of an electronic system, the electronic system configured to apply the user action upon the digital item by means of an activation of a user operable element displayable on the user interface touch screen, the method comprising the steps of displaying the digital object on the user interface touch screen, receiving a selection of the digital object, displaying a user operable element on the user interface touch screen, receiving an activation of the user operable element, and executing the user action upon the digital item.

2. Description of Background Art

User interface touch screens are known, which display digital objects that represent a digital item such as a document or an image. Such a digital object is stored in a memory of the electronic system and may be selected by a user input device, such as a human finger, a stylus, etc. For example, a digital object displayed on the user interface touch screen may be an icon representing a document to be printed, to be edited or to be viewed. To apply a user action upon the document, the digital object may be selected and a user operable element for invoking the user action may be activated. In case of a gesture-enabled touch screen a gesture may be applied to the digital object.

The electronic system may display operable user interface elements on the user interface touch screen, like action buttons for editing, copying, renaming, creating, viewing, printing, copying and deleting the digital object. Each operable user interface element represents a specific operation, which is activated when a piece of underlying function code program is executed. The electronic system may also be implemented as to react on gestures received upon the digital objects displayed on the user interface touch screen. A gesture may be a tap, double tap, drag, flick, pinch, spread, press, press and tap, press and drag, rotate, delete, etc. Applications on electronic systems may support both types of invoking a user action upon a digital item. A user that sees the user operable element on the user interface touch screen may want to invoke a user action by activating the user operable element, while he is unaware of the possibility of a gesture leading to the same user action.

SUMMARY OF THE INVENTION

It is an object of the present invention to enable the user to find the optimal way to accomplish a user action on the user interface touch screen.

According to the present invention, this object is achieved by the method described above, wherein the method comprises the further step of showing an animation of a gesture to the digital object simultaneously with the execution of the user action upon the digital item, which gesture is defined to lead, when applied to the digital object, to execution of the user action upon the digital item.

The method is a computer-implemented method, wherein a user action is to be invoked by means of the user interface touch screen. If the user action is selected by means of the user operable element, the appropriate visualization of the gesture corresponding to the user action is shown on the user interface touch screen as if the user action was invoked directly by means of the gesture. This is helpful for the user who is starting to work with the system. If the user is not aware of certain functionality offered by a gesture to be applied on the digital object on the user interface touch screen, he at first recognizes the functionality for the action in the form of the user operable element availability on the user interface touch screen. By showing the animation of the gesture on the user interface touch screen after the activation of the user operable element, the user becomes aware of the possibility on the user interface touch screen of the application of the gesture for executing the same user action. Next time, the user will use the optimal way to establish the user action on the digital item, and apply the gesture on the user interface touch screen to achieve the user action on the digital item.

According to an embodiment of the method, the animation comprises the appearance and movement of at least one finger image at the digital object. The finger image emphasizes that the user action can be accomplished by using your finger or stylus in order to make a gesture at the user interface touch screen.

According to an embodiment, the digital object and the user operable element are displayed in a same window on the user interface touch screen. Since the user operable element is visible in combination with the digital object, the user always recognizes the possibility of applying a user action upon the digital item represented by the digital object by means of the user operable element. By showing the animation according to the method of the present invention, the user also becomes aware of the further possibility on the user interface touch screen of applying a gesture on the digital object which leads to the same user action upon the corresponding digital item.

According to an embodiment of the method, the digital object is displayed in a first window of the user interface touch screen, the user operable element is displayed in a second window of the user interface touch screen, the first window is closed and the second window is opened after selecting the digital object, and the second window is closed and the first window is opened after receiving the activation of the user operable element.

Electronic systems may have a first window, which supports at least a user action initiated by gestures directly applied upon a digital object and a second window, which supports at least a user action initiated by activating a visible user operable element like a button by applying a tap gesture or double tap gesture upon the user operable element. The second window may be at a lower level in a navigation hierarchy among the windows of the application than the first window, for example due to the fact that a lower level of the application is created according to an older design or according to older user interface techniques, or is of a more detailed level.

In the example mentioned here-above, the first window may be configured to receive gestures to be applied on the first digital object—the icon—while the second window is provided with action buttons for actions to be applied on the digital item—the document. The action buttons may be activated by a tap gesture or a double tap gesture.

The user action available on the first window is also offered on the second window. If the user action is selected in the second window by means of the user operable element, the first window with the appropriate visualization of the gesture corresponding to the user action is shown as if the user action was performed directly on the first window. This is helpful for the user who is starting to work with the system. If the user is not aware of certain functionality offered by a gesture to be applied on the first window, he probably has already navigated to the second window and recognizes the functionality for the action in the form of the user operable element availability on the second window. By showing the animation of the gesture on the first window after the selection of the user operable element on the second window, the user becomes aware of the possibility on the first window of the application of the gesture for executing the same user action. Next time, the user will use the optimal way to establish the user action on the digital item, and apply the gesture on the first window to achieve the user action on the digital item.

According to an embodiment of the method, the user action is one of a delete action, an edit action and a view action. These user actions will be explained hereinafter in combination with the previous embodiment. However, these user actions are also suitable for application of the method according to the present invention, wherein the digital object and the user operable element are displayed in a same window on the user interface touch screen.

A delete action is a user action which usually requires two steps of the user. In a first step, the user indicates that he wants to delete a digital item and in a second step the user explicitly confirms that he certainly wants to delete the digital item. The second window comprises a delete button. In the background art, the second window would show a confirmation window after selection of the delete button. According to the present invention, such a confirmation window has not been implemented, but another solution is implemented. Instead of showing a confirmation button on the second window, the second window closes and the first window appears together with an animation of the gesture leading to delete action, for example, a swipe gesture on the digital object on the first window. The swipe gesture may lead to the appearance of a delete confirmation button, for example, partly on top of the digital object. In this way, the same number of steps has been implemented in the method according to the present invention in order to complete the delete action, namely two steps.

A view action on the first window may be implemented as a gesture, for example a tap, on a first specific part of a digital object. The digital object represents a digital item, for example a digital document. The specific part of the digital object may comprise a thumbnail image of the document. By applying a tap gesture on the thumbnail image, a preview of the document is shown. A user that is not aware of this feature on the first window may tap on another part of the digital object than the thumbnail image and get a second window comprising, for example, the print settings of the document instead of the preview of the document. This second window comprises also a view button. When the user taps on the view button, the second window closes and the first window appears and shows an animation of the tap gesture applied on the thumbnail image in order to show to the unaware user this shortcut for viewing the document. After the animation, the preview of the document is shown.

An edit action on the first window may be implemented as a gesture, for example a tap, on a second specific part of a digital object. The digital object represents a digital item, for example a digital document. The specific part of the first digital object may comprise a selected number of settings for the document to be printed. By applying a tap gesture on the area in which the selected number of settings are displayed, a window comprising all settings of the document is shown. A user that is not aware of this feature on the first window may tap on another part of the digital object than the area with the selected number of settings, for example the thumbnail image, and get a second window comprising, for example, a preview of the document instead of a window comprising the settings of the document. This second window also comprises an edit button. When the user taps on the edit button, the second window closes and the first window appears and shows an animation of the tap gesture applied on the area with the selected number of settings in order to show to the unaware user this shortcut for editing the document. After the animation, the settings of the document are shown.

The present invention also relates to an electronic system comprising a control unit and a user interface touch screen suitable for displaying a first window and a second window according to the method of the present invention and the control unit is configured to perform the steps of the method according to the present invention. An embodiment of the electronic system is an image reproduction apparatus.

The invention also relates to a computer program product embodied on a non-transitory computer readable medium that, when executed on a processor, performs the method according to the present invention. The present invention also relates to a recording medium comprising the computer program product according to present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1A-1B are diagrams, each illustrating a configuration of an electronic system according to the present invention;

DETAILED DESCRIPTION OF THE PREFERRED EMBODIMENTS

FIGS. 1A-1B show an electronic system 1 comprising a user interface touch screen 2 connected to a control device 9. The electronic system 1 may be, for example, a computer system with a processor and memory and user interface touch screen, or an image reproduction system like a printer with a local user interface touch screen. The control device 9 may be integrated with the user interface touch screen 2 in a single holding as shown in FIG. 1B. The control device 9 may be connected to the user interface touch screen 2 by a connection 4, which may be wired or wireless as shown in FIG. 1A. The electronic system 1 may be an e-reader, a tablet personal computer, a phone, a smart phone, a laptop, a notebook, a photo camera, a video camera, a desktop computer, an intelligent white or black board or any other electronic system provided with a user interface touch screen suitable for user input.

Figure 2:
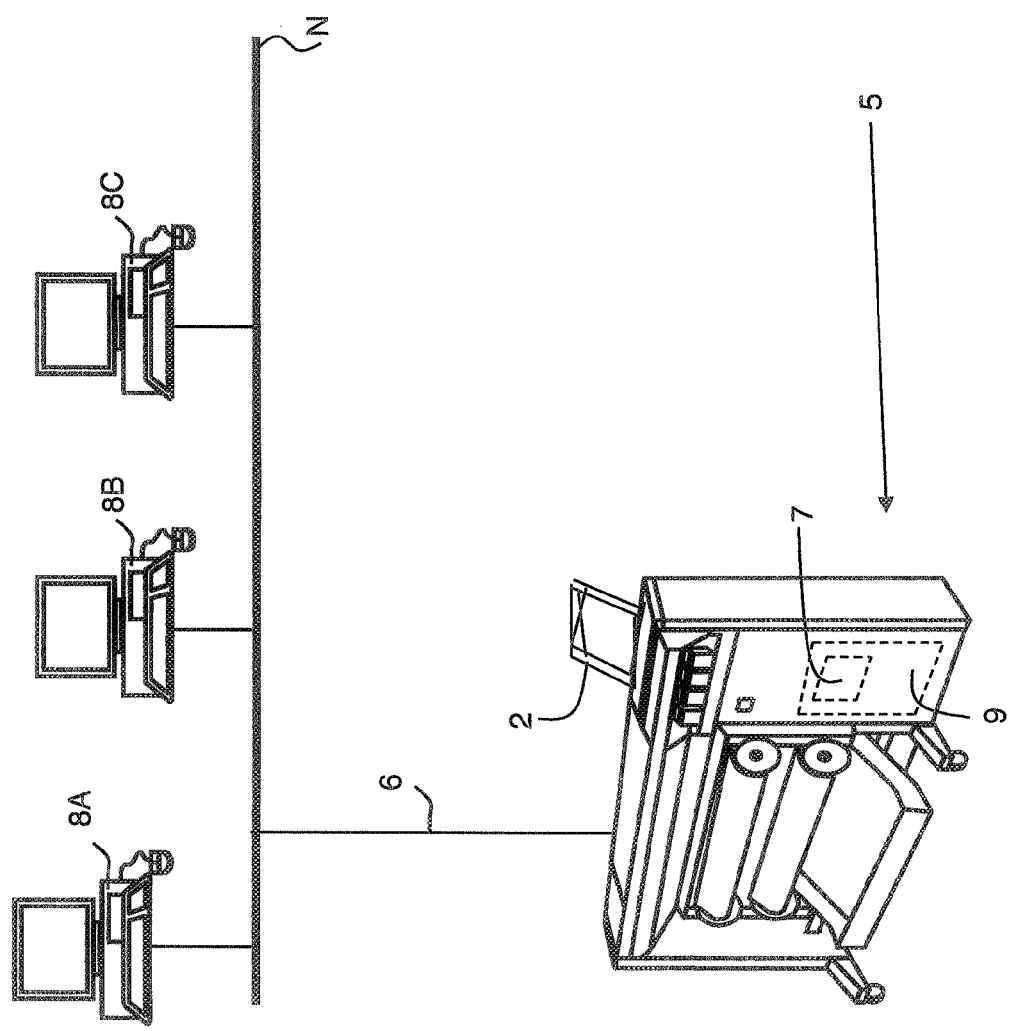
FIG. 2 illustrates a configuration of an electronic system as an image reproduction system according to the present invention.

FIG. 2 illustrates the electronic system integrated in an image reproduction system 5, for example a printer, a copier, a scanner, a multifunctional printer, a small format printer, a wide format printer, inkjet printer, electro-photographical printer, a printer for printing a three-dimensional object, etc. The present invention is particularly suited for use in this kind of environment, where the image reproduction system 5 is available via a network connection 6 for a user working with workstations 8A, 8B, 8C, which are connected via a network N. The user may send a print job comprising a set of digital items from the workstations 8A, 8B, 8C to the control device 9 of the image reproduction system 5. The control device 9 comprises a storage device 7 configured to store print jobs, however a storage device for storing print jobs, documents or images may also be provided by an external system like a web server, a cloud service or an external server, which is connected via a network to the control device 9. The display 2 acts as a user interface touch screen and is suitable for displaying a digital object like a thumb nail, an icon, a text item, an image, etc. in order to represent a digital item like an electronic document, an image, a print job, a user print mail box, a USB device, etc.

The control device 9 may be suited to queue print jobs, to check whether or not the print queue is empty and to submit a document from a queued print job to the print engine of the image reproduction system 5 in order to be printed. The control device 9 may comprise a storage device 7 for storing digital items, for example documents of a print job. When a print job arrives at the image reproduction system 5 according to FIG. 2, it is stored in the control device 9.

Figure 3:
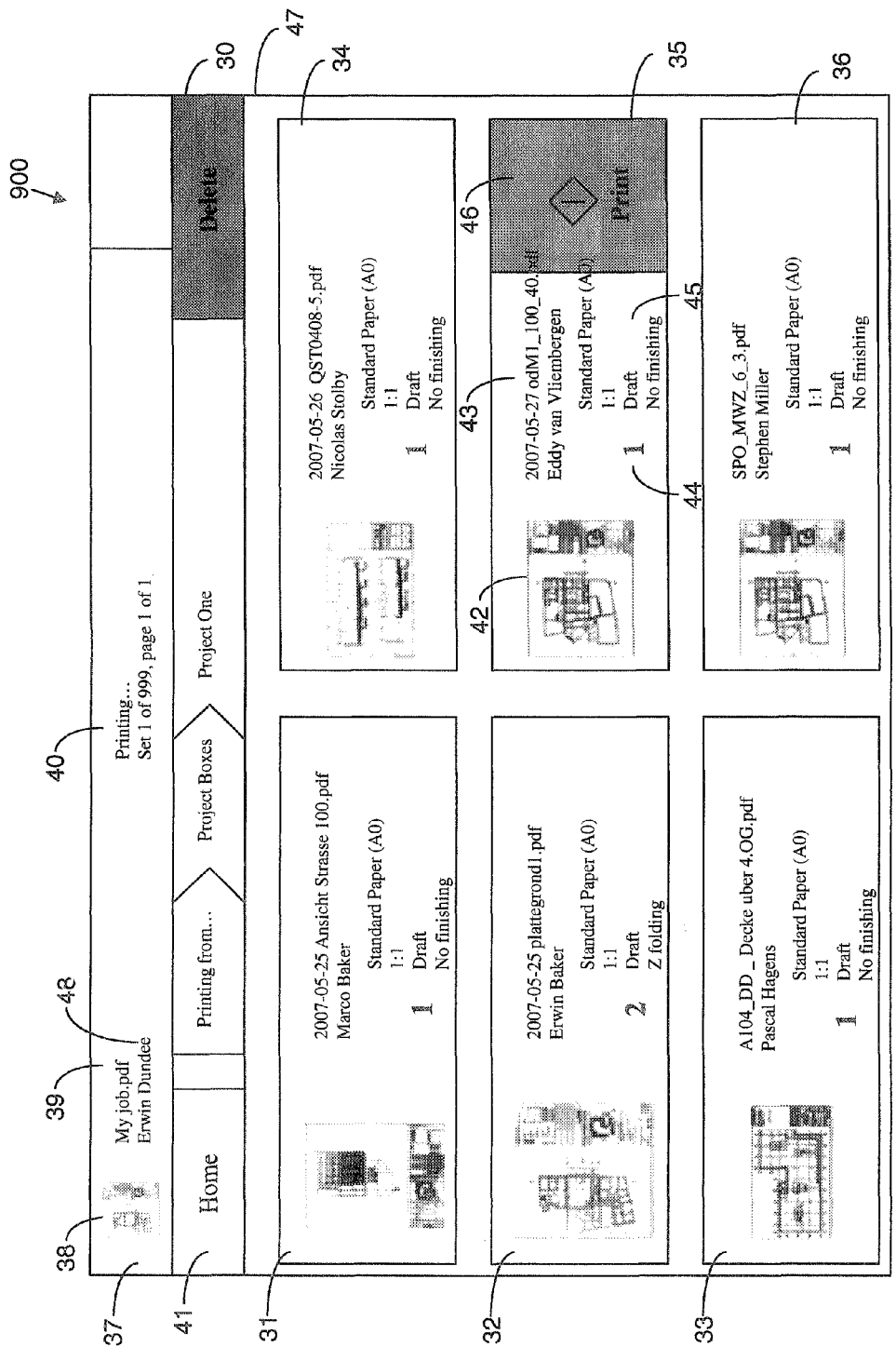
FIGS. 3-13 illustrate windows for implementations of the method according to the present invention, wherein the user action is a delete action, a view action or an edit action.
Figure 4:
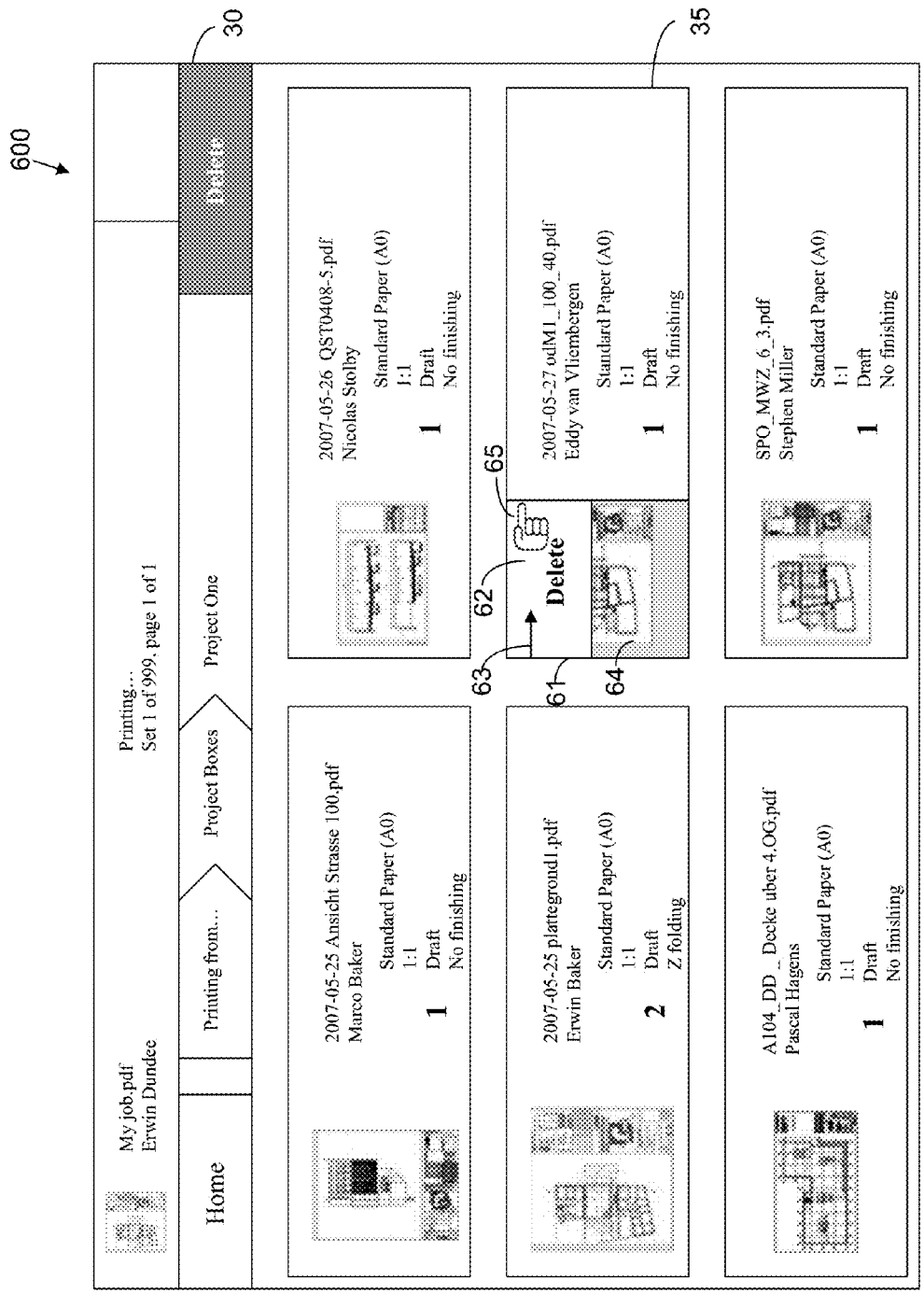
Figure 5:
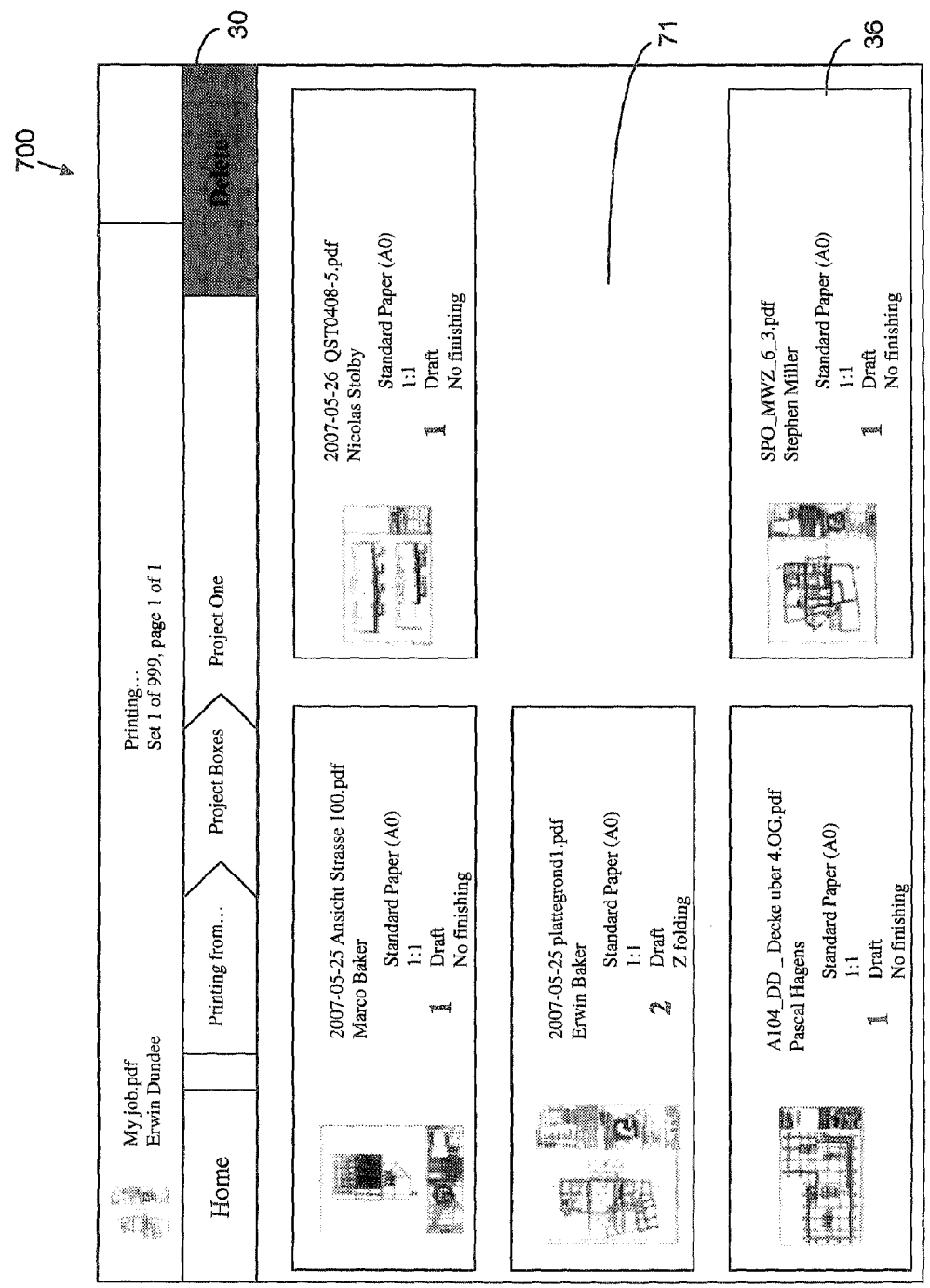

FIGS. 3-5 illustrate windows according to the present invention, wherein a first digital object and a user operable element are displayed in a same window on the user interface touch screen. According to this embodiment, digital objects representing digital documents are shown. The most important user action upon the digital documents is printing the digital documents, however other user actions like viewing, editing, calling, renaming, creating, scanning, scheduling, deleting, reverting, undoing, etc. are envisaged.

FIG. 3 shows a first window 900, which comprises a status area 37, a trajectory area 41, a first delete button 30 and a document area 47. The status area 37 comprises a thumbnail image 38 of a print job currently being printed, a filename 39 of a document of the print job, a name 48 of the owner of the print job and a status 40 of the print job. The trajectory area 41 comprises a bread crumb path indicating the path that leads to a directory in the file system of the electronic system. The directory indicated in the trajectory area 41 is the directory in which a selected print job resides. The first delete button 30 is a user operable element for deleting a selected document. The document area 47 comprises digital objects 31-36, each of which represents a document. The documents 31-36 may be queued for printing, already scanned, already printed or suitable for other actions than printing, for example a digital item on a USB stick. Each digital object 31-36 consists of two parts. A first part 42 of the digital object 31-36 comprises a thumbnail image of the document represented by the digital object. A second part 43 of the digital object 31-36 corresponds to characteristics of the document, i.e. the filename and owner of the document, print settings 45 for the document to be printed, and a number 44 of prints. When a digital object 31-36 is selected by means of a tap on the digital object area—a rectangle in FIG. 3—a print button 46 appears on top of the digital object. In an embodiment, a digital object may be preselected when the first window 900 is opened and the preselected digital object is already overlapped with the print button 46. In FIG. 3, the fifth digital object 35 is selected. When a digital object is selected, tapping on the first part 42, the second part 43 or the print button 46 results in different user action. Also, making a swiping gesture at the digital object will result in a different user action.

For this example, tapping on the first area 42 results in a view action, tapping on the second area 43 results in an edit action, tapping on the print button results in a print action and making a swipe gesture at the digital object 35 results in a delete action. The tapping and swiping may also be applied on the fifth digital object 35 when the fifth digital object 35 is not selected. A user may be unaware of these possibilities and he may want to delete the document corresponding to the selected fifth digital object 35 and he notices the first delete button 30 on the first window 900. So, the user taps on the delete button 30 in order to delete the document. The system then starts an animation on the first window 900 as if the delete action was initiated on the first window 900 by means of the swiping gesture at the fifth digital object 35. Almost instantaneously, the print button 46 fades away from the fifth digital object 35 and, as shown in FIG. 4 from the left side 61 of the digital object 35, a second delete button 62 slides into the first area of the digital object 35 (the first area 42 as shown in FIG. 3) in a direction indicated by an arrow 63. In an alternative embodiment, in an additional step of the animation, the first delete button 30 disappears as long as the second delete button 62 is visible on the window 600. The second delete button 62 partially overlaps the thumbnail image 64 corresponding to the document represented by the fifth digital object 35. The end situation is shown in a window 600 of FIG. 4. The user becomes aware of the possibility of a delete action on the first window 900 by swiping at the fifth digital object 35. By tapping on the second delete button 62 in the window 600, the user confirms the delete action—initiated on the first window 900 by activation of the first delete button 30 on the first window 900—and the document corresponding to the fifth digital object 35 is deleted from the file system of the electronic system.

FIG. 5 shows the end situation of the delete action, i.e. a window 700 on which the fifth digital object is removed and, at the former place of the fifth digital object, an empty space 71 has emerged. In another embodiment, the sixth digital object is moved to the former place of the fifth digital element. The first delete button 30 is still present on the window 700.

This embodiment also comprises other actions than the delete action upon the digital item, like view, edit, revert, load, create, change, rename, move to, or make settings, etc. In case of another user action, an appropriate user operable element is configured to be displayed at the same first window 900.

FIGS. 6-11 illustrate an embodiment of the method according to the present invention, wherein the digital object is displayed in one window of the user interface touch screen, the user operable element is displayed in another window of the user interface touch screen, the one window is closed and the other window is opened after the selecting of the digital object, and the other window is closed and the one window is opened after receiving the activation of the user operable element. According to this embodiment, digital objects representing digital documents are shown. The most important user action upon the digital documents is printing the digital documents, however other user actions like viewing, editing, calling, renaming, creating, scanning, scheduling, deleting, reverting, etc. are envisaged.

Figure 6:
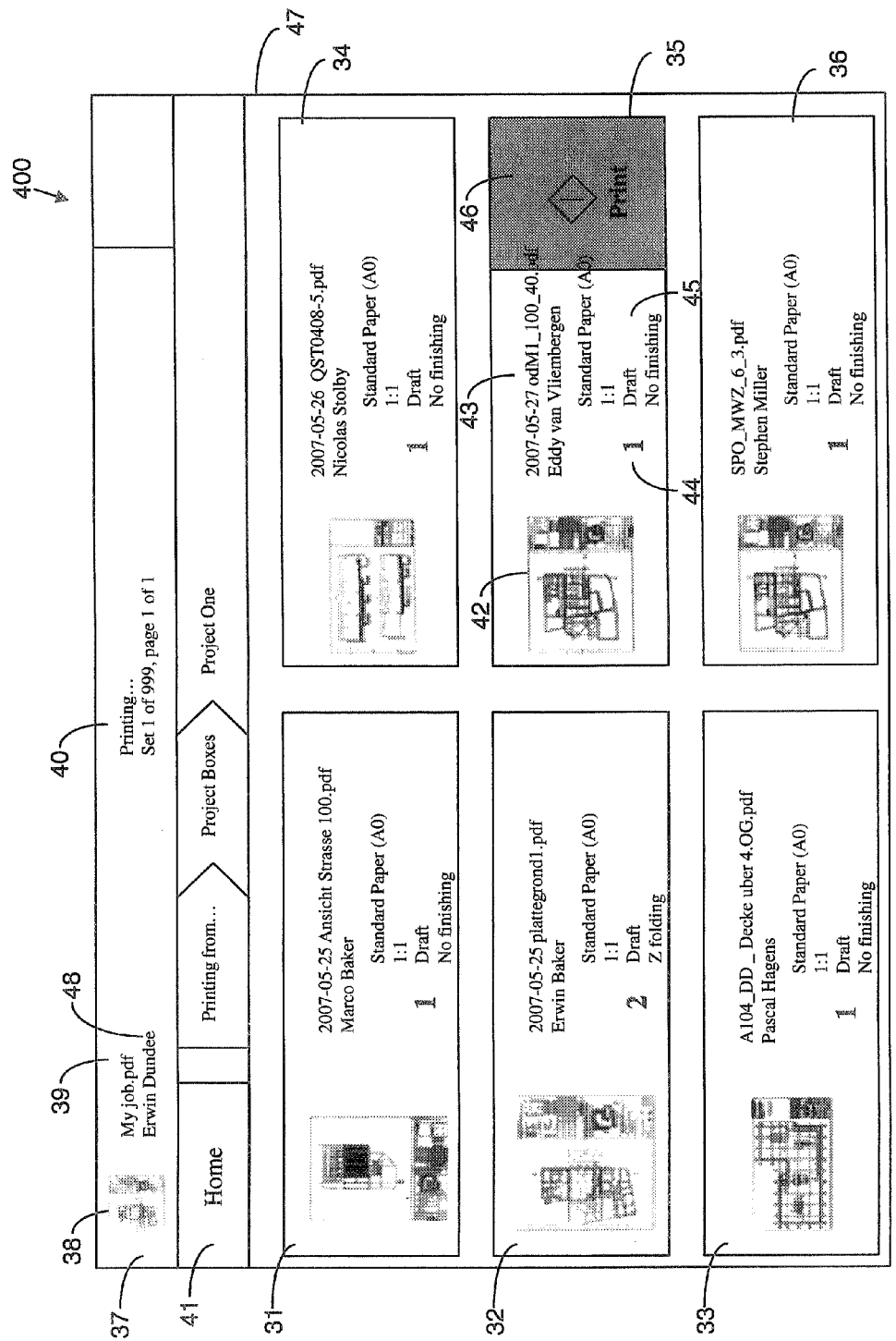

FIG. 6 shows a second window 400, similar to the first window 900 in FIG. 3. The second window 400 comprises a status area 37, a trajectory area 41 and a document area 47. The status area 37 comprises a thumbnail image 38 of incoming print job, a filename 39 of a document of the print job, a name 48 of the owner of the print job and a status 40 of the print job. The trajectory area 41 comprises a bread crumb path indicating the path that leads to a directory in the file system of the electronic system. The directory indicated in the trajectory area 41 is the directory in which a selected print job is resided. The document job area 47 comprises digital objects 31-36, each of which represents a document. Each digital object 31-36 consists of two parts. A first part 42 of the digital object 31-36 comprises a thumbnail image of the document represented by the digital object. A second part 43 of the digital object 31-36 corresponds to characteristics of the document, i.e. the filename and owner of the document, print settings 45 for the document to be printed, and a number 44 of prints. When a digital object 31-36 is selected by means of a tap on the digital object area—a rectangle in FIG. 6—a print button 46 appears on top of the digital object. In an embodiment, a digital object may be preselected when the second window 400 is opened and the preselected digital object is already overlapped with the print button 46. In FIG. 6, the fifth digital object 35 is selected. When a digital object is selected, tapping on the first part 42, the second part 43 or the print button 46 results in different user action. Also, making a swiping gesture at the digital object will result in a different user action.

Figure 7:
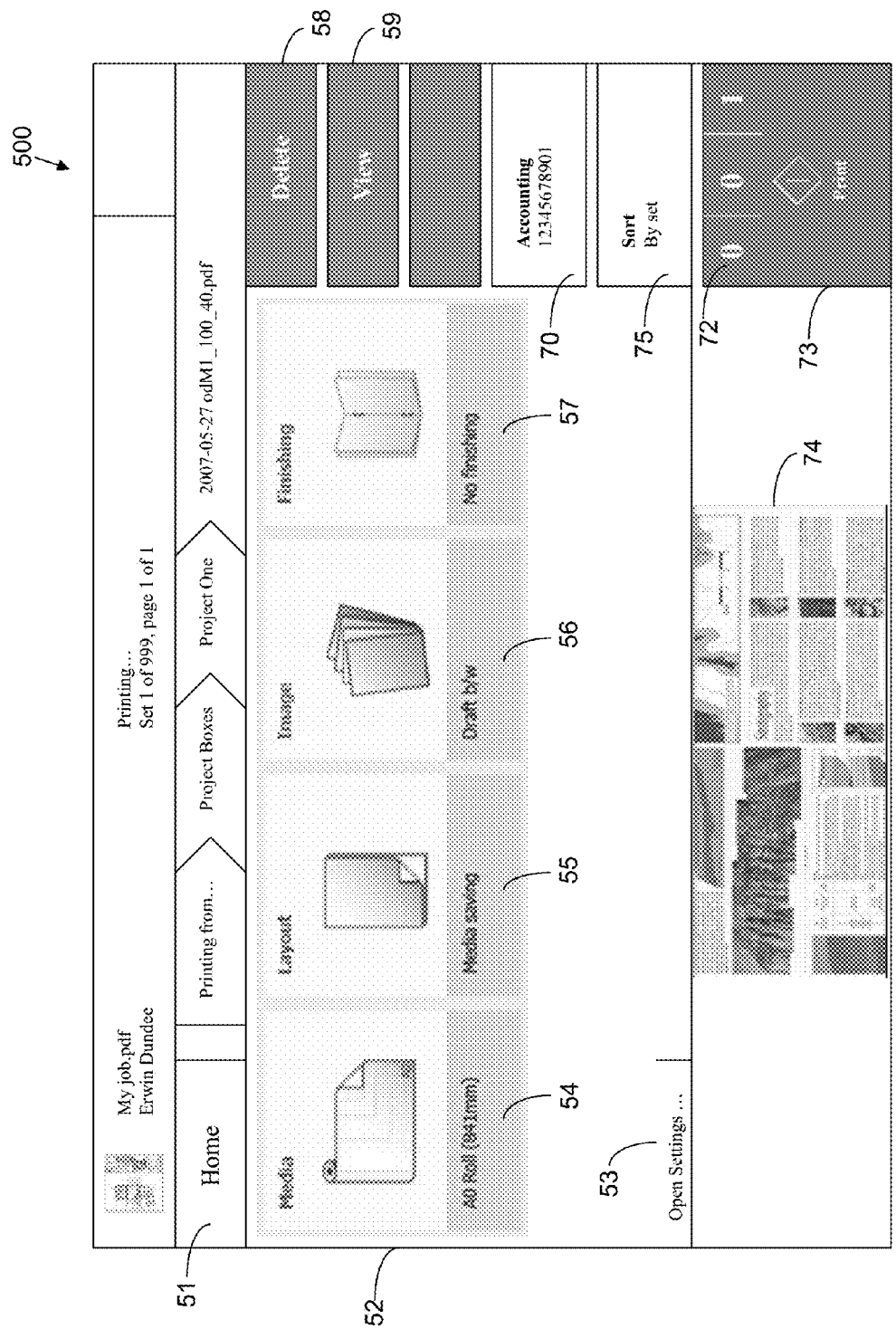

For this example, tapping on the first area 42 results in a view action, tapping on the second area 43 results in an edit action, tapping on the print button results in a print action and making a swipe gesture at the digital object 35 results in a delete action. A user may be unaware of these possibilities and may just tap on the middle part, i.e. the second area 43 of the digital object 35 in order to apply further actions on the document corresponding to the fifth digital object 35. Since the user has tapped on the middle part 43, a third window 500 appears as shown in FIG. 7.

The third window 500 comprises a status area similar to the status area 37 in FIG. 6, a trajectory area 51 comprising an adapted path that ends in the name of the selected document, a print settings area 52 and a small preview area 74. Further, the third window 500 comprises a delete button 58, a view button 59, accounting information 70, a sorting criterion 75, and a print button 73. The print button 73 comprises an indication of the number 72 of prints to be produced. The print settings area 52 comprises four digital objects 54-57 respectively representing the settings for the media options, the layout options, the image options and the finishing options. To allow the user to see all settings together, a selectable text object 53 is also available in the print settings area 52.

The user has missed the opportunity of using the delete action or the view action on the second window 400, the user now has a second chance to delete or to view the document by tapping on the delete button 58 or the view button 59 respectively on this third window 500. The user may have missed the opportunity for example, since he first of all changed the settings of the digital item, made a print and wanted to delete the digital item afterwards. Or the user may have missed the opportunity for example, since he first of all wanted to see a preview of the digital item before printing it, was unhappy with the result and wanted to delete the digital item afterwards.

Figure 8:
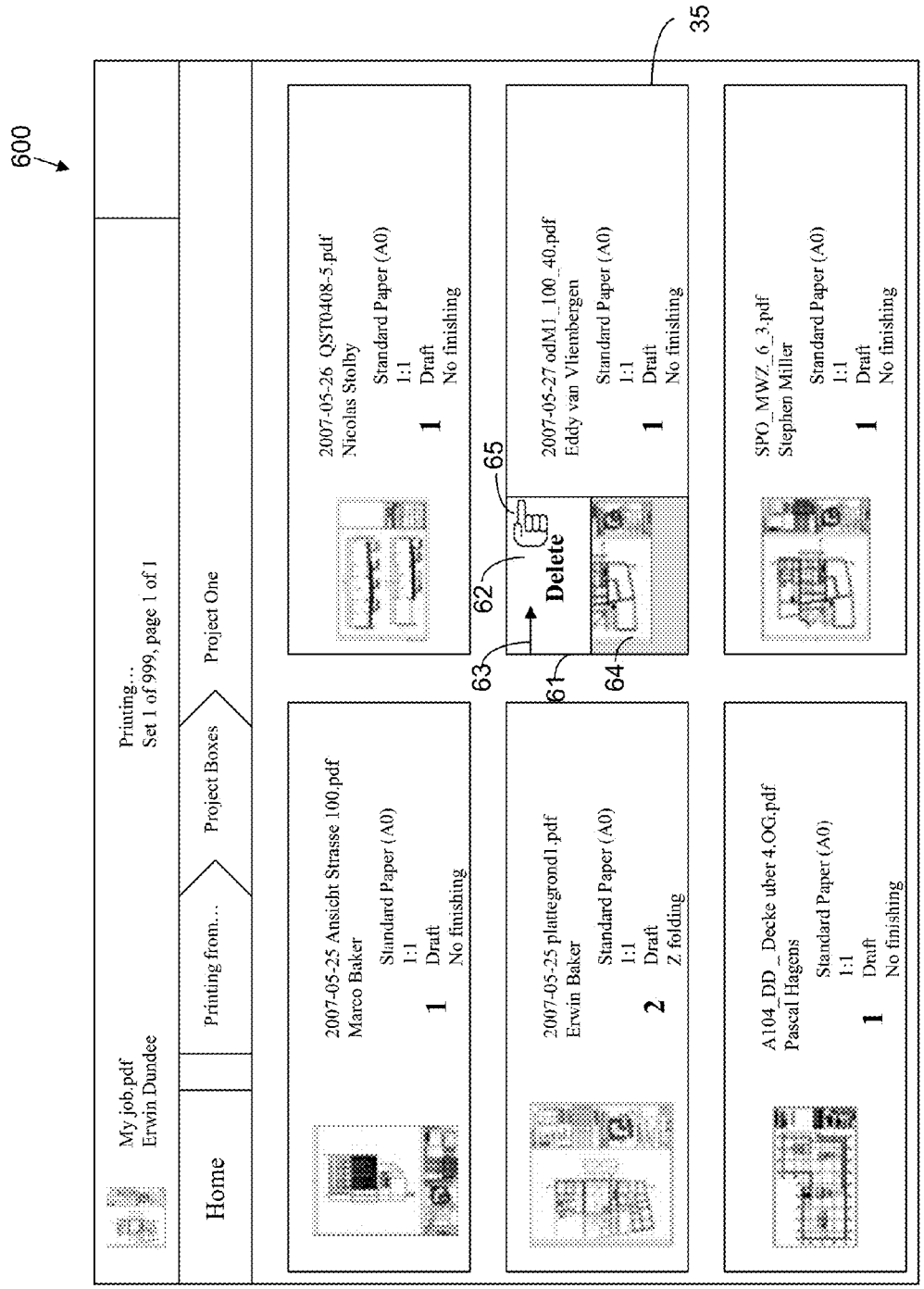

When tapping on the delete button 58 on the third window 500, the third window 500 closes and the second window 400 as in FIG. 6 appears again. The system then starts an animation on the second window 400 as if the delete action was initiated on the second window 400. Almost instantaneously, the print button 35 (See FIG. 6) fades away from the fifth digital object 35 and, as shown in FIG. 8 from the left side 61 of the digital object 35, a delete button 62 slides into the first area of the digital object 35 (the first area 42 as shown in FIG. 6) in a direction indicated by an arrow 63. The delete button 62 partially overlaps the thumbnail image 64 corresponding to the document represented by the fifth digital object 35. The end situation is shown in a window 600 of FIG. 8. The user becomes aware of the possibility of a delete action on the second window 400 by swiping at the fifth digital object 35. By tapping on the delete button 62 in the window 600, the user confirms the delete action—initiated on the third window 500 by activation of the delete button 58 on the third window 500—and the document corresponding to the fifth digital object 35 is deleted from the file system of the electronic system.

Figure 9:
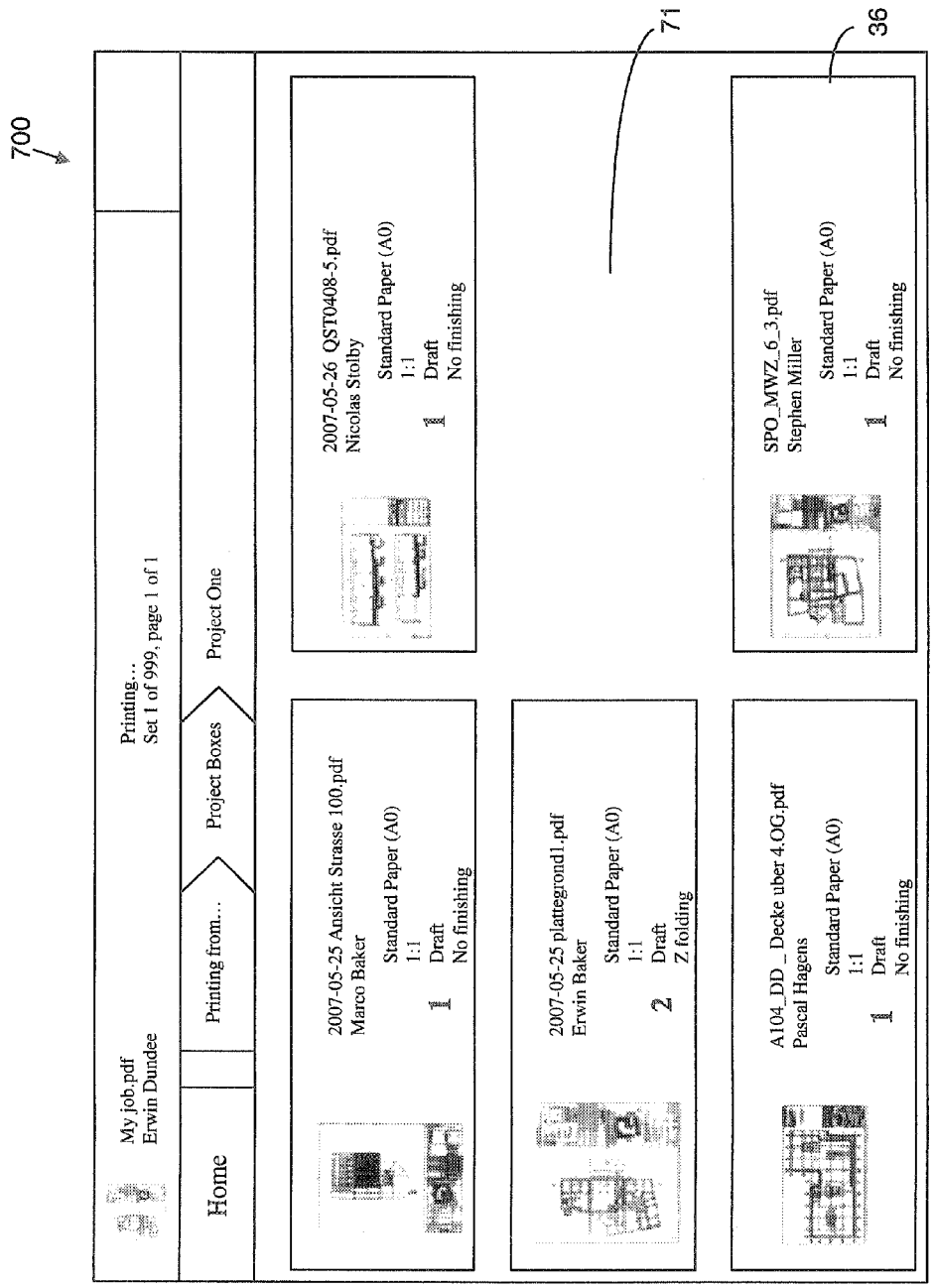

FIG. 9 shows the end situation of the delete action, i.e. a window 700 on which the fifth digital object is removed and, at the former place of the fifth digital object, an empty space 71 has emerged. In another embodiment, the sixth digital object 36 is moved to the former place of the fifth digital object.

Figure 10:
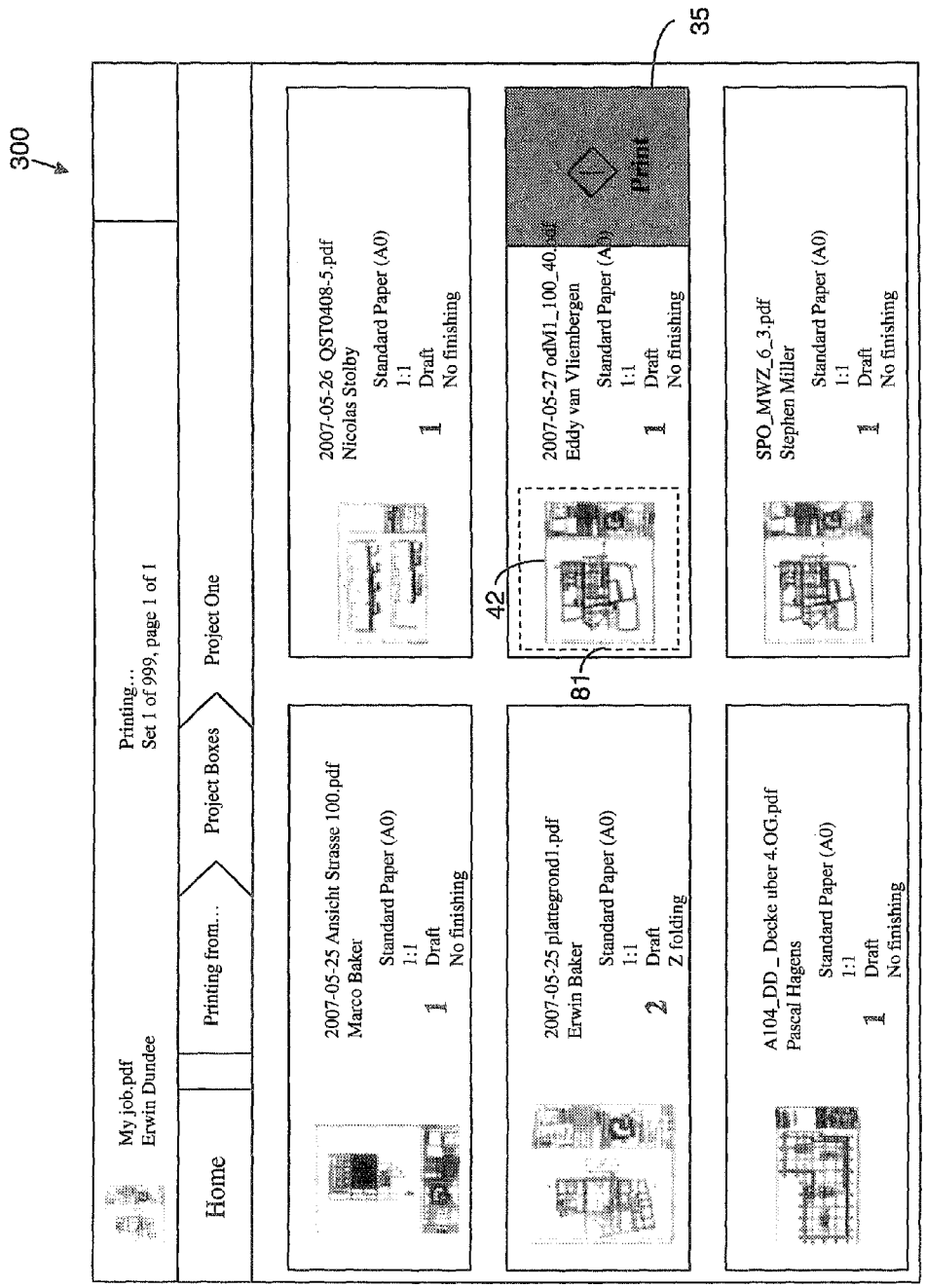
Figure 11:
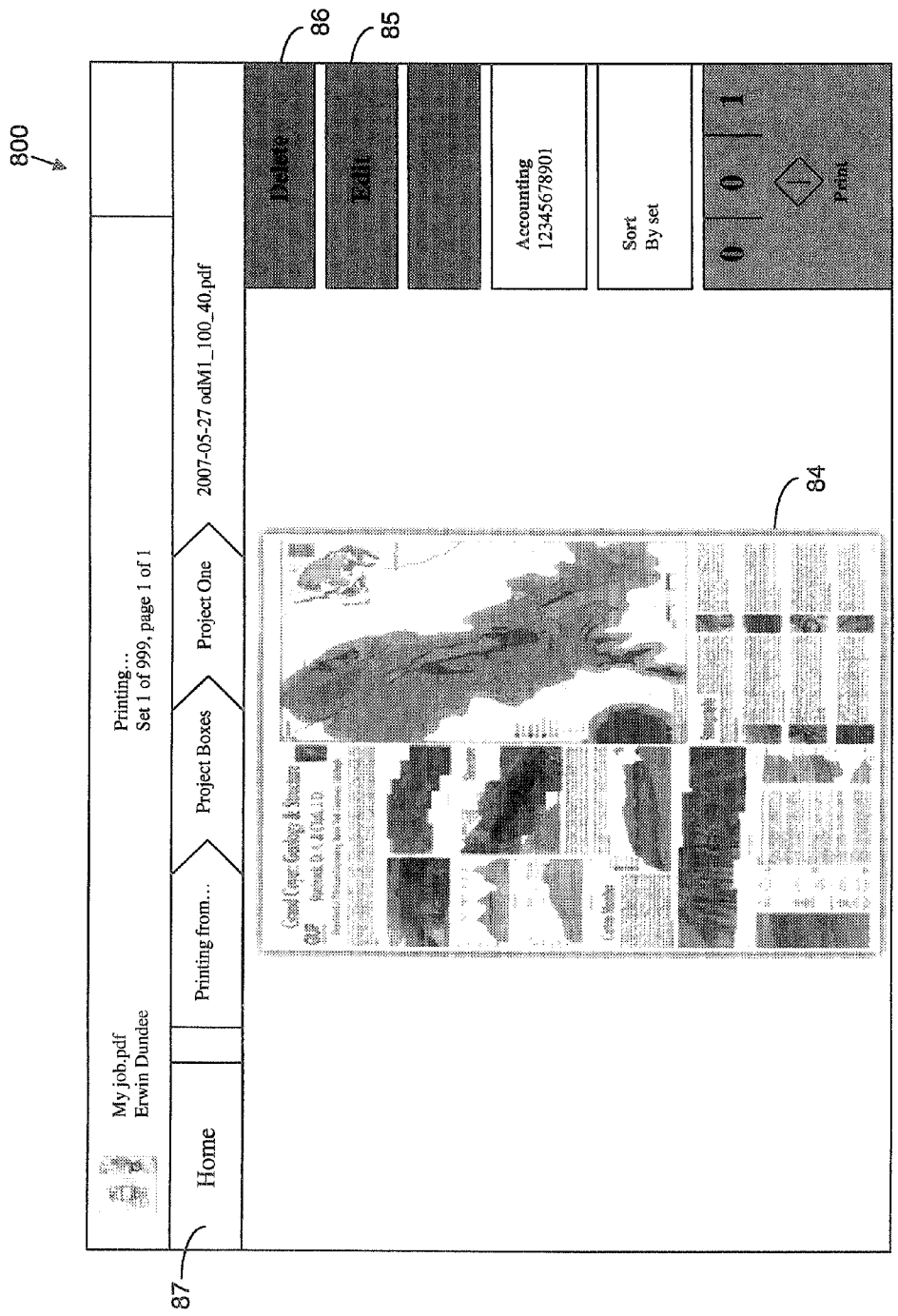

A second case will now be explained starting with the third window 500 in FIG. 7. In addition to the delete button 58, a view button 59 is also present. When the user taps on the view button 59, the third window 500 is closed and the second window 300 as in FIG. 10 is opened. The system then starts an animation on the second window 300, as if the view action was initiated on the second window 300. Almost instantaneously, the first area 42 of the fifth digital object 35 is shown as being tapped upon, for example by means of an appearance of a dashed rectangle 81 or a small movement of the first area 42 animating a tap gesture on the first area 42. Then, the second window 300 is closed and a view window 800 appears as shown in FIG. 11. The user becomes aware of the possibility of a view action on the second window 300 by tapping on the first area 42.

The view window 800 comprises a preview image 84 of the document corresponding to the fifth digital object 35, a delete button 86 and an edit button 85.

Figure 12:
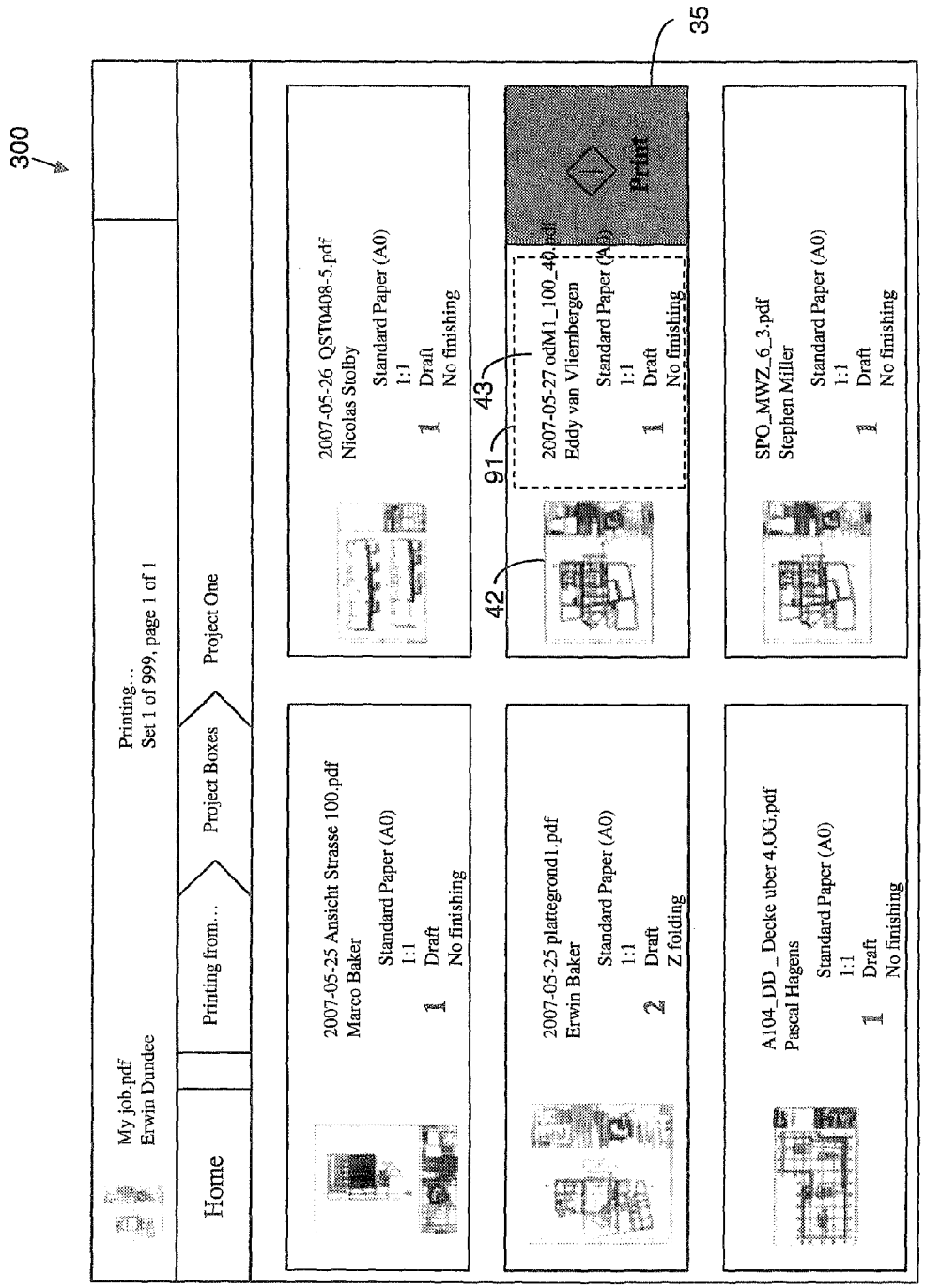

When the use taps at the edit button 85, the view window 800 is closed and the second window 300 is opened again as shown in FIG. 12.

The system then starts an animation on the second window 300 in FIG. 12 as if the edit action was initiated on the second window 300. Almost instantaneously, the second area 43 of the fifth digital object 35 is shown as being tapped upon, for example by means of an appearance of a dashed rectangle 91 or a small movement of the second area 43 animating a tap gesture on the second area 43. Then, the second window 300 is closed and the third window 500 appears as already shown in FIG. 7. The user becomes aware of the possibility of an edit action on the second window 300 by tapping on the second area 43. The user has already performed this action—in first instance unaware of the consequences—by tapping on the middle part of the fifth digital object 35 on the second window 400 in FIG. 6.

Figure 13:
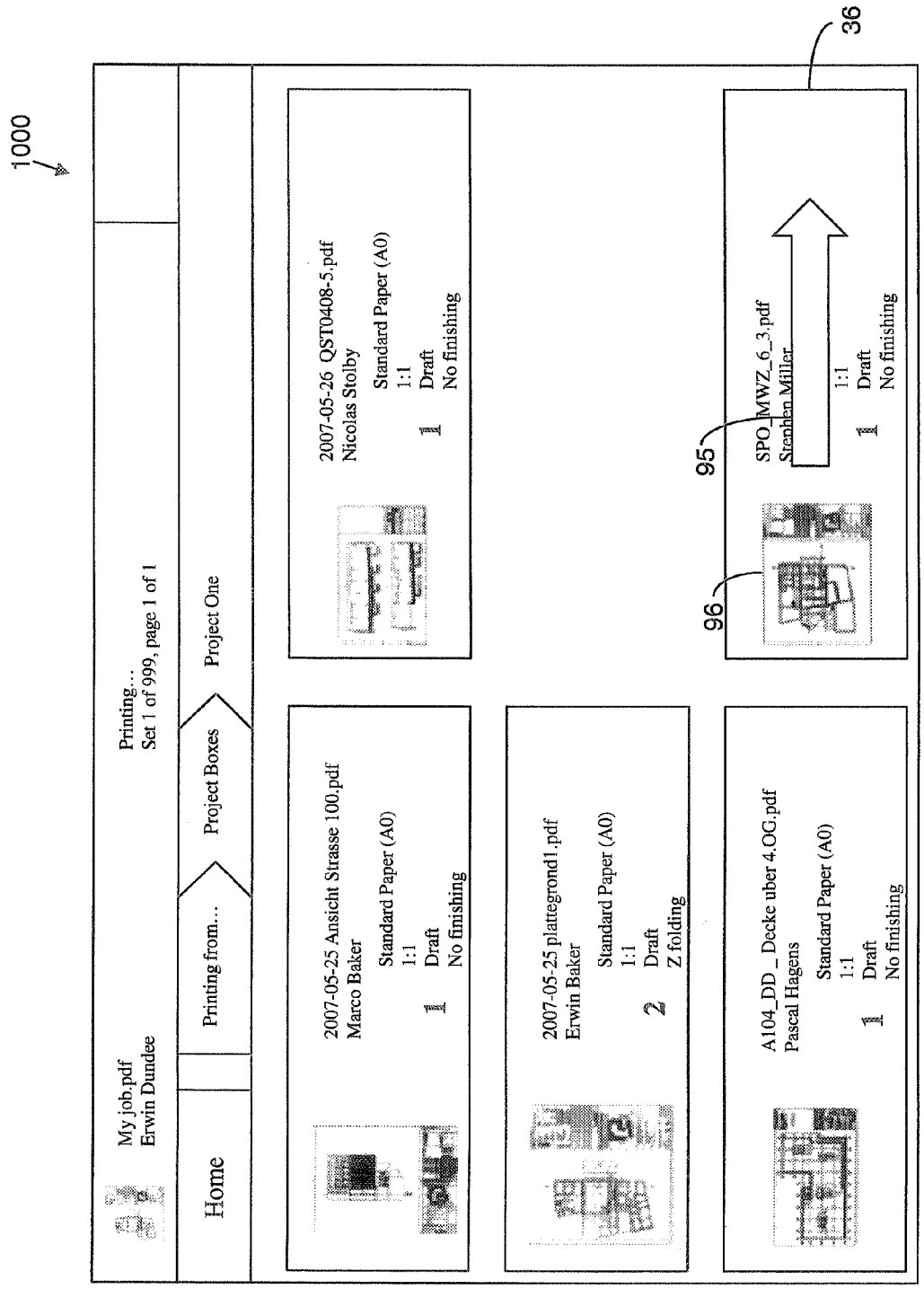

The user has now learned to apply implemented gestures at the second window 400, which he was unaware of before he started to look at the documents to be printed. When the user now arrives during his work at the second window 1000 as shown in FIG. 13 and he wants for example to delete the document corresponding to the sixth digital object 36, he immediately applies a swiping gesture 95 at the sixth digital object 36 and the delete button will appear—being equivalent as shown in FIG. 8 for the fifth digital object—on the first area 96 of the sixth digital object 36 in order to let the user confirm the delete action. The user has quickly learned the gestures to be used and has increased his productivity and thus the productivity of the electronic system.

The windows shown in FIGS. 3-13 may be combined in one way or another. Such combinations are within the scope of the present invention.

In addition to a delete action, an edit action and a view action, other user actions may be envisaged, like a print action, a rename action, a change action, a revert action, a load action, a create action, or make settings. Such other user actions fall within the scope of the present invention.

The digital item may be a digital image, a digital document, a digital document, a print job, a copy job, a user mailbox, a directory in a filing system, a directory on a plugged in USB stick, etc.

Figure 14:
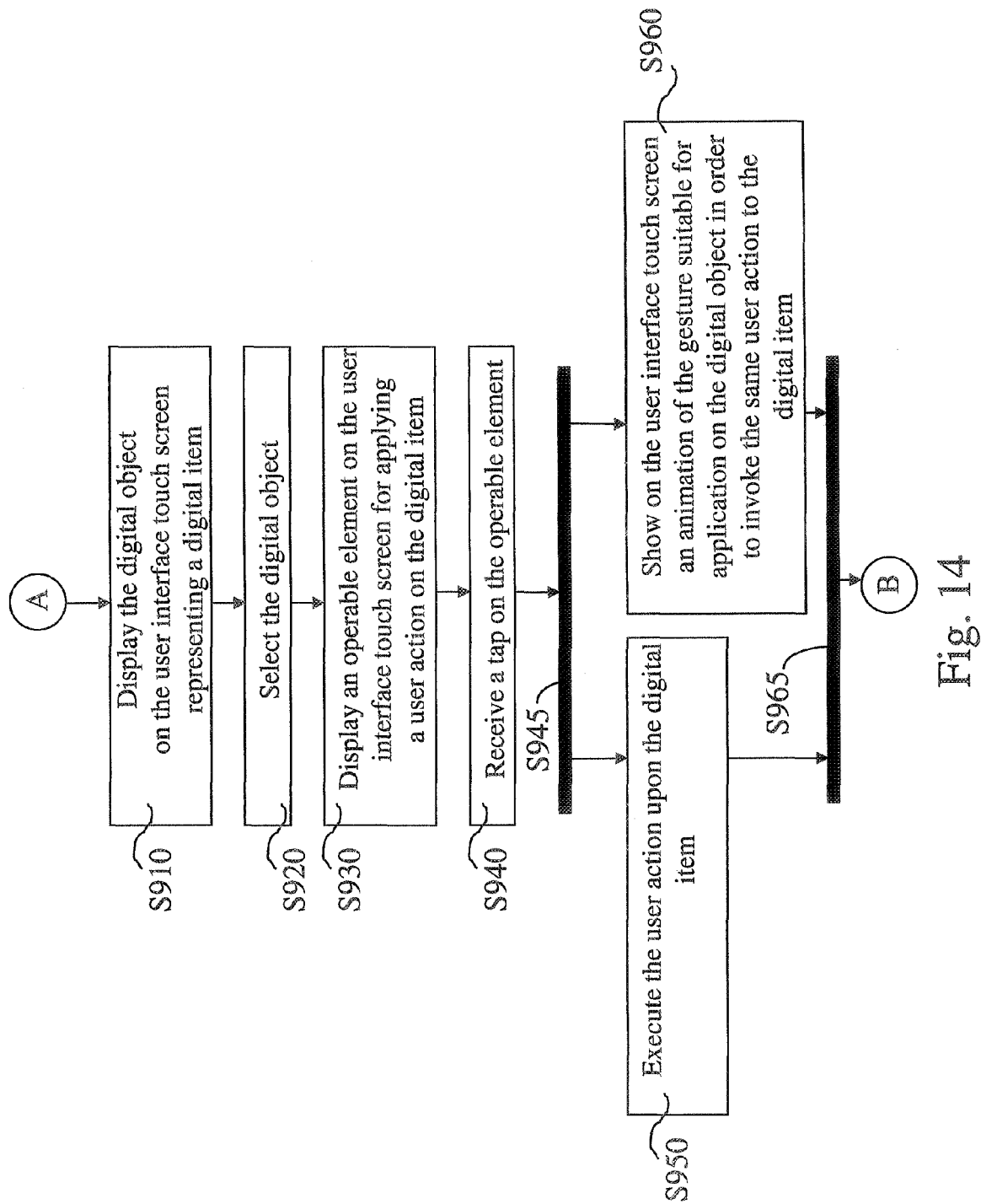
FIGS. 14-16 are flow diagrams of the method according to the present invention.

FIG. 14 shows a first flow diagram of the method according to the present invention. This flow diagram is in particular suitable when the digital object and the user operable element are visible on a same window displayed at the user interface touch screen.

A starting point A leads to a first step S910 wherein the digital object is displayed on the user interface touch screen. The digital object represents a digital item. A user action may be applied upon the digital item by means of a gesture on the digital object on the user interface touch screen of the electronic system.

In a second step S920, the digital object is selected. The selection may be done by a user tapping on the digital object or by the electronic system that selects the digital object on the basis of predetermined selection criteria. In the latter case, the order of the steps S910 and S920 may be the other way around.

In a third step S930, a user operable element is displayed on the user interface touch screen. The user operable element is suitable for applying a same user action to the digital item as the gesture on the user interface touch screen.

In a fourth step S940, the electronic system registers a tap on the user operable element. The user wants to apply the user action on the digital item.

In a fork step S945 symbolized by the black rectangle S945 two steps, a fifth step S950 and a sixth step S960 are executed before the procedure joins in a join step S965 symbolized by the black rectangle S965.

In the fifth step S950, the user action is executed upon the digital item.

In the sixth step S960, an animation of the gesture suitable for application on the digital object in order to invoke the same user action on the digital item is shown. In a further embodiment, the animation is accompanied by at least one finger image—referenced to by reference number 65 in FIG. 4 and FIG. 8—which follows the movement of the animated gesture.

After the join step S965, the procedure ends in an endpoint B.

Figure 15:
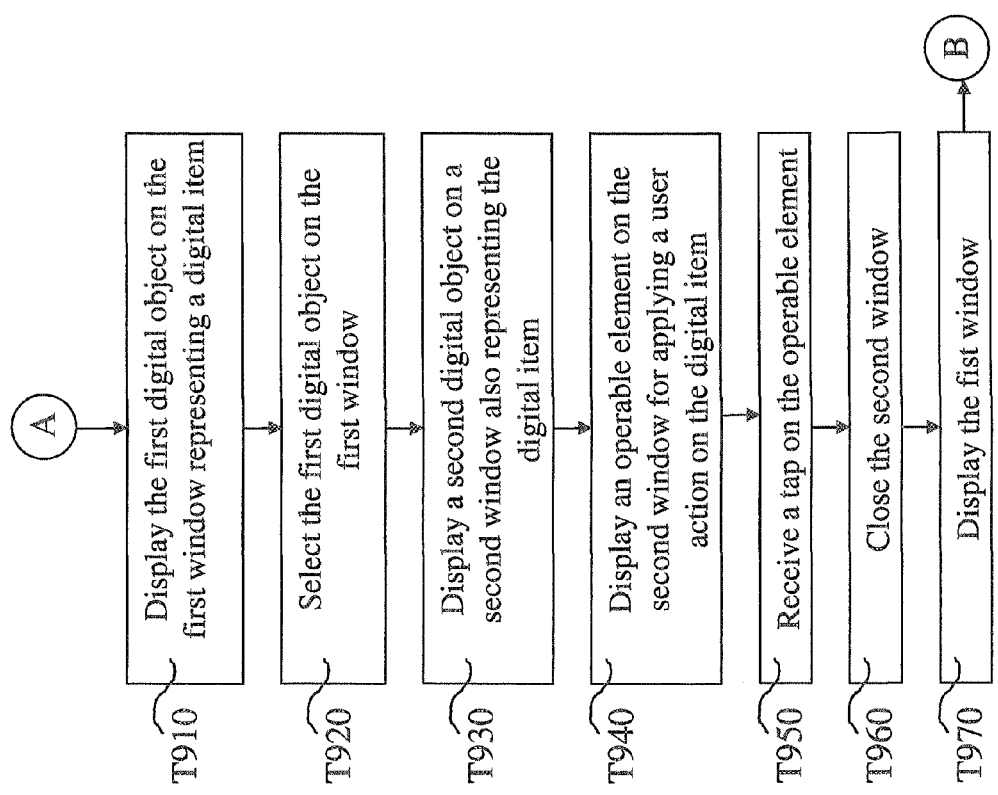
Figure 16:
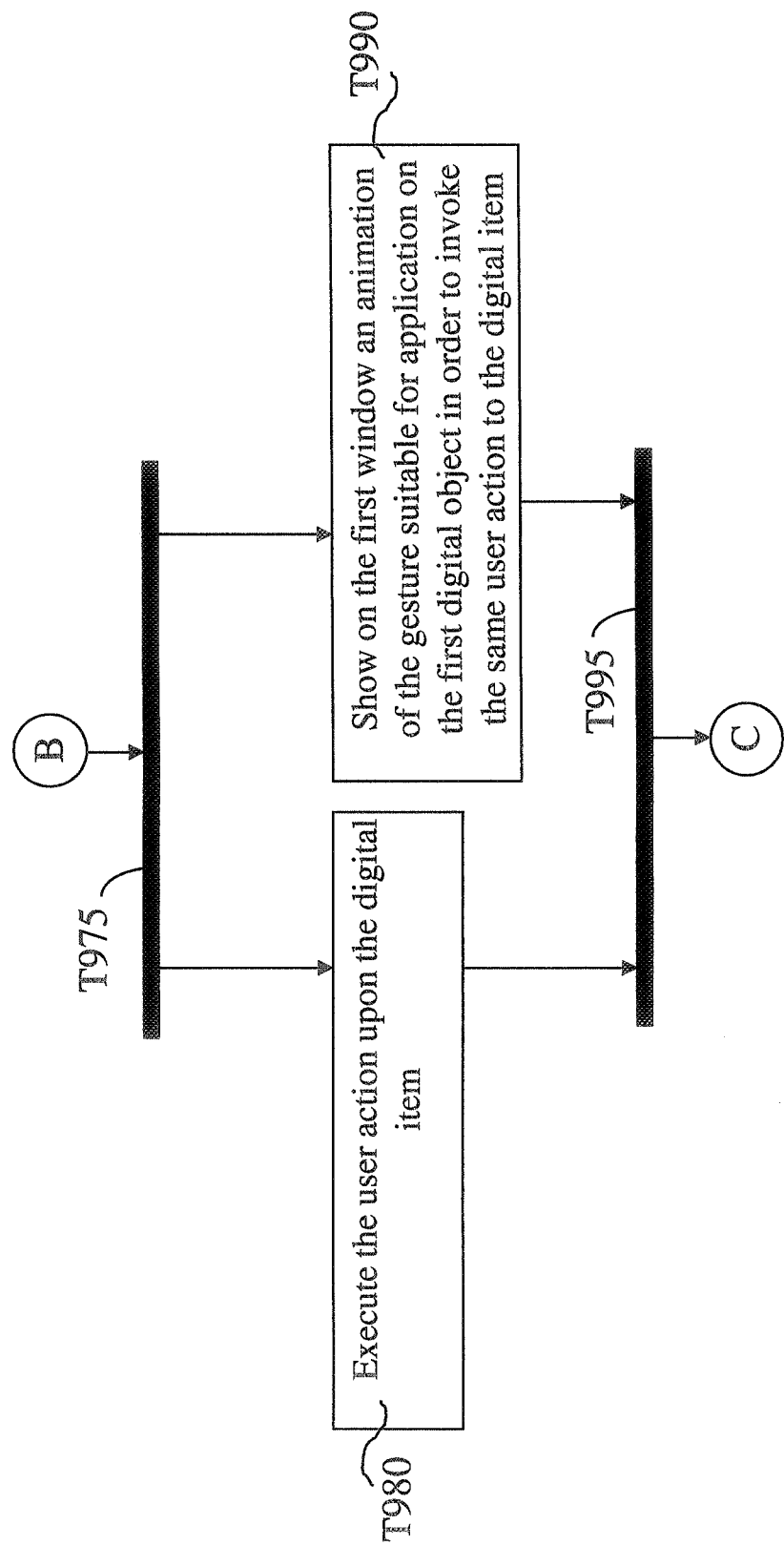

FIGS. 15-16 show a second flow diagram of the method according to the present invention.

A starting point A leads to a first step T910, wherein the first digital object on the first window is displayed. The first digital object represents a digital item. A user action may be applied upon the digital item by means of a gesture on the first digital object on the first window of the user interface touch screen of the electronic system.

In a second step T920, the first digital object is selected. The selection is done by a user tapping on the first digital object In a third step T930, a second digital object is displayed on a second window. The second digital object also represents the digital item. The second window may replace the first window on the user interface touch screen.

In a fourth step T940, a user operable element is displayed on the second window. The user operable element is suitable for applying a same user action to the digital item as a gesture on the first window, which gesture is suitable for applying the same user action upon the digital item.

The order of the third step T930 and the fourth step T940 may be the other way around. These two steps T930 and T940 may also be processed in parallel.

In a fifth step T950, the electronic system registers a tap on the user operable element. The user wants to apply the user action on the digital item.

In a sixth step T960, the second window is closed.

In a seventh step T970, the first window is opened again leading to intermediate point B in FIG. 16.

The method proceeds in intermediate point B in FIG. 16.

In a fork step T975, symbolized by the black rectangle T975 two steps, an eighth step T980 and a ninth step T990 are executed before the procedure joins in a join step T995, symbolized by the black rectangle T995.

In the eighth step T980, the user action is executed upon the digital item.

In the ninth step T990, an animation of the gesture suitable for application on the first digital object in order to invoke the same user action on the digital item is shown. In an embodiment, the animation is accompanied by at least one finger image—referenced to by reference number 65 in FIG. 4 and FIG. 8—which follows the movement of the animated gesture.

After the join step T995, the procedure ends in an endpoint C.

All foregoing described embodiments are suitable to be combined with or to be incorporated in the steps S910-S965 of the flow diagram of FIG. 14 or in the steps T910-T995 of the flow diagram of FIGS. 15-16. The method may be adapted in an appropriate way in order to be applied to a plurality of digital objects displayed on the user interface touch screen, whereby a multi-selection on the plurality of digital objects is envisaged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for performing a user delete action to be applied on a digital item in a memory of an electronic system, the digital item being represented by a digital object displayable on a user interface touch screen of the electronic system, the electronic system configured to apply the user delete action upon the digital item by means of an activation of a first user operable element displayable on the user interface touch screen, the method comprising the steps of:
displaying the digital object on the user interface touch screen;
receiving a selection of the digital object;
displaying the first user operable element on the user interface touch screen;
receiving an activation of the first user operable element, after the selection of the digital object;
executing the user delete action upon the digital item represented by the selected digital object;
showing an animation of a single gesture, the animation being directly applied at a location of the selected digital object on the user interface touch screen after the activation of the first user operable element, without manually applying the single gesture to the selected digital object by the user, simultaneously with the execution of the user delete action upon the digital item represented by the selected digital object, the single gesture being applicable to the selected digital object and defined to lead, when applied to the selected digital object, to execution of the user delete action upon the digital item represented by the selected digital object,
wherein the animation of the single gesture comprises a shift of a second user operable element on the user interface screen, the second user operable element being used for confirmation of the user delete action, and
wherein the digital item is a digital document or a digital image.

2. The method according to claim 1, wherein the animation comprises the appearance and movement of at least one finger image at the digital object.

3. The method according to claim 1, wherein the digital object is displayed in a first window of the user interface touch screen, the first user operable element is displayed in a second window of the user interface touch screen, the first window is closed and the second window is opened after selecting the digital object, and the second window is closed and the first window is opened after receiving the activation of the first user operable element.

4. The method according to claim 1, wherein the digital object and the first user operable element are displayed in a same window on the user interface touch screen.

5. The method according to claim 1, wherein the digital object is a digital icon.

6. The method according to claim 1, wherein the digital object includes a first part of an image of the digital item represented by the digital object and a second part of characteristics of the digital item represented by the digital object.

7. The method according to claim 1, wherein the animation of the single gesture at least partially overlaps with the selected digital object.

8. The method according to claim 1, wherein the animation of the single gesture comprises the shift of a second user operable element at the location of the selected digital object on the user interface screen, the second user operable element at least partially overlaps with the selected digital object.

9. The method according to claim 1, wherein the animation of a single gesture is an animated image of a user's finger(s) along with an animated movement of the animated image animating a gesture of the user's finger(s) for performing a delete action, and is directly shown on the selected digital object at the location of the selected digital object, and wherein the animation of a single gesture is accompanied with the second user operable element sliding into an area of the selected digital object at the location of the selected digital object.

10. The method according to claim 1, wherein the animation is directly applied at a location of the selected digital object on the user interface touch screen after the activation of the first user operable element, without manually applying the single gesture or any other gesture to the selected digital object by the user.

11. A method for performing a user delete action to be applied on a digital item in a memory of an electronic system, the digital item being represented by a digital object displayable on a user interface touch screen of the electronic system, the electronic system configured to apply the user delete action upon the digital item by means of an activation of a first user operable element displayable on the user interface touch screen, the method comprising the steps of:
displaying the digital object on the user interface touch screen;
receiving a selection of the digital object;
displaying the first user operable element on the user interface touch screen;
receiving an activation of the first user operable element, after the selection of the digital object;
showing an animation of a single gesture, the animation being directly applied at a location of the selected digital object on the user interface touch screen after the activation of the first user operable element, without manually applying the single gesture to the selected digital object by the user, simultaneously with the execution of a user delete action upon the digital item represented by the selected digital object, the single gesture being applicable to the selected digital object and defined to lead, when applied to the selected digital object, to execution of the user delete action upon the digital item represented by the selected digital object,
wherein the animation of the single gesture comprises a shift of a second user operable element on the user interface screen, the second user operable element being used for confirmation of the user delete action; and
deleting the digital item represented by the selected digital object by activating the second user operable element,
wherein the digital item is one of a digital image, a digital document, a print job, a copy job, a user mailbox, a directory in a filing system and a directory on a plugged-in USB stick.

12. The method according to claim 11, wherein the animation of the single gesture comprises the shift of a second user operable element at the location of the selected digital object on the user interface screen, the second user operable element at least partially overlaps with the selected digital object.

13. The method according to claim 11, wherein the animation of a single gesture is an animated image of a user's finger(s) along with an animated movement of the animated image animating a gesture of the user's finger(s) for performing a delete action, and is directly shown on the selected digital object at the location of the selected digital object, and wherein the animation of a single gesture is accompanied with the second user operable element sliding into an area of the selected digital object at the location of the selected digital object.

14. The method according to claim 11, wherein the animation is directly applied at a location of the selected digital object on the user interface touch screen after the activation of the first user operable element, without manually applying the single gesture or any other gesture to the selected digital object by the user.

15. An electronic system comprising:
a control unit; and
a user interface touch screen configured to display a digital object, a first user operable element and a second user operable element,
wherein the control unit is configured to:
display the digital object on the user interface touch screen;
receive a selection of the digital object;
display the first user operable element on the user interface touch screen;
receive an activation of the first user operable element, after the selection of the digital object;
execute the user delete action upon the digital item represented by the selected digital object;
show an animation of a single gesture, the animation being directly applied at a location of the selected digital object on the user interface touch screen after the activation of the first user operable element, without manually applying the single gesture to the selected digital object by the user, simultaneously with the execution of the user delete action upon the digital item represented by the selected digital object, the single gesture being applicable to the selected digital object and defined to lead, when applied to the selected digital object, to execution of the user delete action upon the digital item represented by the selected digital object,
wherein the animation of the single gesture comprises a shift of the second user operable element on the user interface screen, the second user operable element being used for confirmation of the user delete action, and
wherein the digital item is a digital document or a digital image.

16. The electronic system according to claim 15, wherein the electronic system is an image reproduction apparatus.

17. A computer program product embodied on a non-transitory computer readable medium that, when executed on a processor, instructs the processor to perform a method for performing a user delete action to be applied on a digital item in a memory of an electronic system, the digital item being represented by a digital object displayable on a user interface touch screen of the electronic system, the electronic system configured to apply the user delete action upon the digital item by means of an activation of a first user operable element displayable on the user interface touch screen, the method comprising the steps of:
displaying the digital object on the user interface touch screen;
receiving a selection of the digital object;
displaying the first user operable element on the user interface touch screen;
receiving an activation of the first user operable element, after the selection of the digital object;
executing the user delete action upon the digital item represented by the selected digital object;
showing an animation of a single gesture, the animation being directly applied at a location of the selected digital object on the user interface touch screen after the activation of the first user operable element, without manually applying the single gesture to the selected digital object by the user, simultaneously with the execution of the user delete action upon the digital item represented by the selected digital object, the single gesture being applicable to the selected digital object and defined to lead, when applied to the selected digital object, to execution of the user delete action upon the digital item represented by the selected digital object,
wherein the animation of the single gesture comprises a shift of a second user operable element on the user interface screen, the second user operable element being used for confirmation of the user delete action, and
wherein the digital item is a digital document or a digital image.

* * * * *